June 10, 1958     K. J. KLARMAN     2,837,923
DAMPING DEVICE FOR GYROSCOPE OR THE LIKE
Filed May 10, 1951
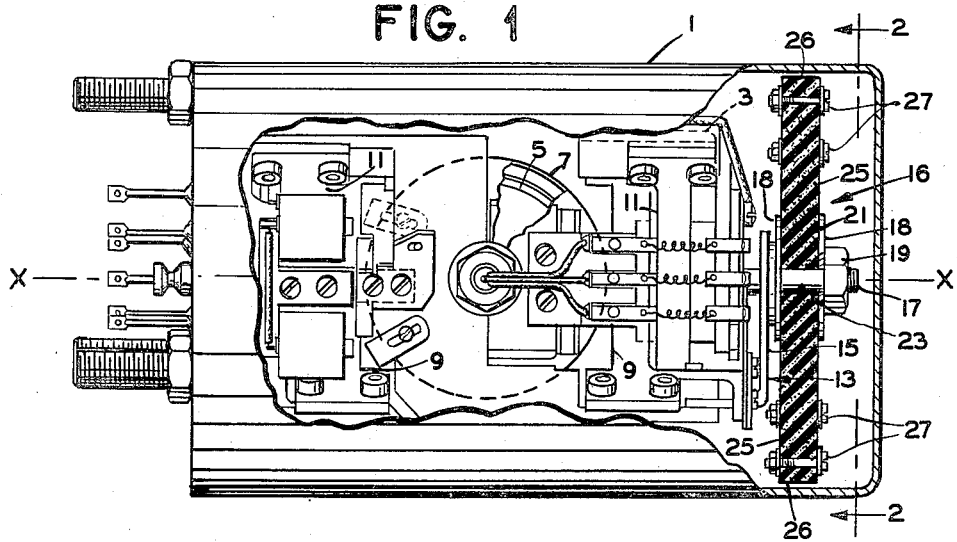
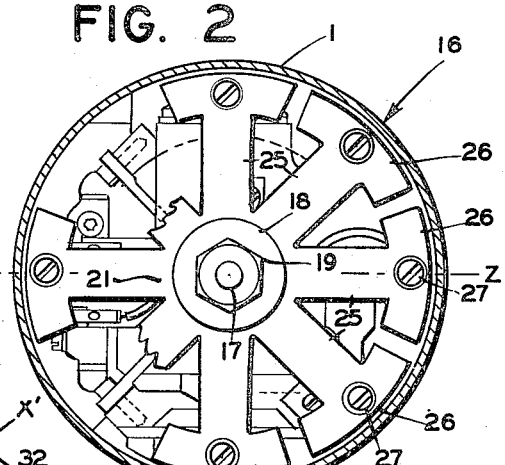
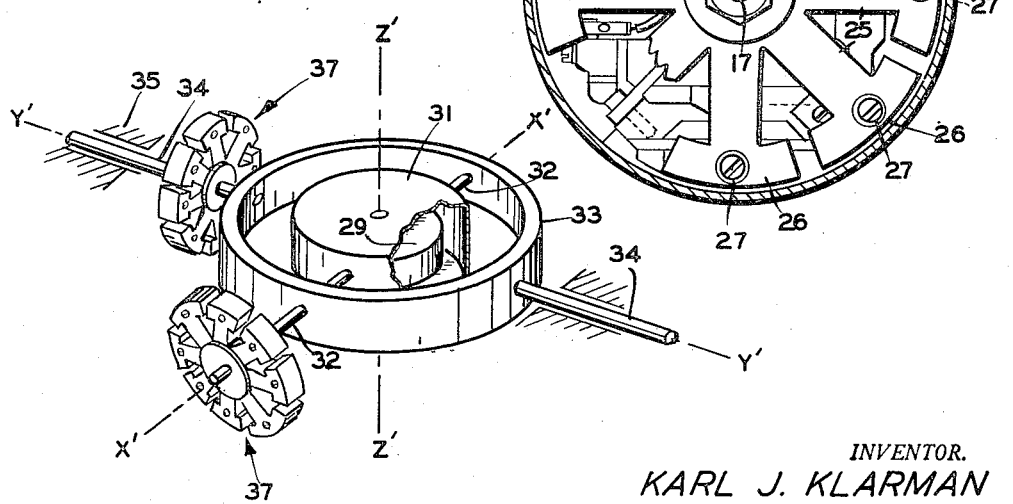
INVENTOR.
KARL J. KLARMAN
BY
ATTORNEY United States Patent Office 2,837,923
Patented June 10, 1958

2,837,923
DAMPING DEVICE FOR GYROSCOPE OR THE LIKE

Karl J. Klarman, Clifton, N. J., assignor to Bendix Aviation Corporation, Teterboro, N. J., a corporation of Delaware Application May 10, 1951, Serial No. 225,519

10 Claims. (Cl. 74—5.5)

The invention relates to damping devices for apparatus subject to vibration and one object of the invention is to damp vibration by means of harmonic absorption.

Another object is to provide a damping device which has a greater damping effect at the natural frequency of vibration and a lesser damping effect at other frequencies.

Another object is to damp vibration without mechanical engagement between parts of the device to cause hysteresis or other errors.

Another object is to provide a damping device which is simple and cheap to construct.

Another object is to provide a damping device for a gyroscope which will not exert precessing forces on the gyroscope.

The invention contemplates a damping device having a plurality of radial arms extending therefrom and mounted on apparatus subject to vibration. The arms preferably are of rubber, such as sponge rubber or silicone rubber, and may be provided with masses adjusted so that the device resonates near the critical frequency of vibration of the main system. The device preferably is mounted on an axis about which the apparatus vibrates, such as a precession axis of a gyroscope.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

In the drawing, Figure 1 is in part an elevation view and in part a vertical section of an angular rate gyroscope having a damping device constructed according to the invention;

Figure 2 is an elevation view of the angular rate gyroscope at right angles to the view of Figure 1 with the housing shown in section; and Figure 3 is a perspective view of a vertical gyroscope having a pair of damping devices constructed according to the invention and mounted on the precession axes of the gyroscope.

Referring now to the drawing for a more detailed description of the novel damping device of the present invention, Figures 1 and 2 show an angular rate gyroscope having a housing 1 enclosing a supporting frame 3. A rotor 5 is rotatably supported in a casing 7 with its spin axis ZZ disposed horizontally. The casing is mounted for precession about an axis XX relative to frame 3 by pairs of crossed substantially planar springs 9, 11. The springs support the casing without friction from the frame and provide limited freedom therefor and the precession movement of the gyroscope about axis XX is substantially proportional to the rate of angular movement of the craft on which the gyroscope is mounted.

The gyroscope is substantially of the kind shown and described in application Serial No. 122,671, filed October 21, 1949 by Henry Konet and assigned to the same assignee as the present application.

An L shaped bracket 13 is rigid with casing 7 and includes a portion 15 extending perpendicularly to the precession axis XX of the gyroscope.

A damping device 16 constructed according to the invention has its axis aligned with the precession axis of the gyroscope and is mounted on a threaded member 17 secured to portion 15 of bracket 13. The device is secured to member 17 between a pair of washers 18 by a nut 19 threaded on the member.

The damping device has a hub portion 21 with an axial bore 23 receiving member 17 and a plurality of arms 25 extending radially from hub 21. Each arm 25 preferably has a circumferential rim portion 26 provided with a mass 27 near its end for tuning the arms to resonate near the critical frequency of the gyroscope. The arms preferably are unconfined to provide for their relative movement and are tuned to resonate at different frequencies near the critical frequency. Arms 25 and hub and rim portions 26 preferably are formed of rubber, such as sponge rubber or silicone rubber. The energy caused by vibration of the system is absorbed by the arms.

In Figure 3, the damping device is applied to a vertical gyroscope having a spin axis Z'Z' adapted for rotation about mutually perpendicular axes X'X' and Y'Y'. The gyroscope comprises a rotor 29 mounted in a casing 31 for rotation about the spin axis Z'Z'. The casing is rotatable on trunnions 32 in a gimbal 33 rotatably supported by trunnions 34 in a frame 35. A damping device 37 of the kind described above is mounted on each trunnion 32, 34 coaxial with the precession axes X'X', Y'Y' of the gyroscope.

The damping device is simple and inexpensive to manufacture and eliminates any mechanical contact between parts of the system which might result in hysteresis or precession errors.

While the device has been shown and described as applied to gyroscopes, it should be understood that the device may be applied to servos, accelerometers and other systems subject to resonance and vibration.

Although but two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A damping device formed of soft rubber comprising a hub portion for securing the device to apparatus subject to vibration, and a plurality of unconfined arms extending radially from said hub portion and provided with circumferential rim portions to damp vibration of said apparatus.

2. A damping device of soft rubber comprising a hub portion for securing the device to apparatus subject to vibration, a plurality of arms extending radially from said hub portion to damp vibration of said apparatus, and a plurality of masses secured to said arms and positioned and arranged so that the device resonates near the critical frequency of vibration of the apparatus.

3. A damping device of soft rubber comprising a hub portion for securing the device to apparatus subject to vibration, a plurality of arms extending radially from said hub portion to damp vibration of said apparatus, and a plurality of masses secured to said arms and positioned and arranged so that the arms are tuned to different frequencies of vibration and the device resonates near the critical frequency of vibration of the apparatus.

4. In combination with apparatus having a member rotatable about an axis and being subject to vibration about said axis, a damping device of soft rubber having a plurality of radially extending unconfined arms provided with circumferential rim portions and coaxial with said axis to damp vibration of said apparatus.

5. In combination with apparatus having a member rotatable about an axis and being subject to vibration about said axis, a damping device of soft rubber having a plurality of radially extending arms and coaxial with said axis to damp vibration of said apparatus, and a plurality of masses secured to said arms and positioned and arranged so that the device resonates near the critical frequency of vibration of said apparatus.

6. A gyroscope having a rotor adapted to spin about one axis and to precess about an axis at an angle thereto, a damping device of soft rubber mounted on said gyroscope with its axis aligned with the precession axis of the gyroscope and having a plurality of arms extending radially therefrom to damp vibration of the gyroscope.

7. A gyroscope having a rotor adapted to spin about one axis and to precess about an axis at an angle thereto, a damping device of soft rubber mounted on said gyroscope with its spin axis aligned with the precession axis of the gyroscope and having a plurality of arms extending radially therefrom, and a plurality of masses secured to said arms and positioned and arranged so that the device resonates near the critical frequency of vibration of the gyroscope.

8. A gyroscope having a rotor adapted to spin about one axis and to precess about an axis at an angle thereto, a damping device of soft rubber mounted on said gyroscope with its spin axis aligned with the precession axis of the gyroscope and having a plurality of arms extending radially therefrom, and a plurality of masses secured to said arms and positioned and arranged so that the arms are tuned to different frequencies and the device resonates near the critical frequency of vibration of the gyroscope.

9. A gyroscope having a rotor adapted to spin about one axis and rotatable about a pair of mutually perpendicular axes at an angle to the spin axis, a damping device of soft rubber mounted on said gyroscope coaxial with each of said mutually perpendicular axes and having a plurality of arms extending radially therefrom to damp vibration of the gyroscope.

10. A gyroscope having a rotor adapted to spin about one axis and to precess about a pair of mutually perpendicular axes at an angle to the spin axis, a damping device of soft rubber mounted on said gyroscope coaxially with each of said mutually perpendicular axes and having a plurality of arms extending radially therefrom to damp vibration of the gyroscope, and a plurality of masses secured to said arms and positioned and arranged so that the device resonates near the critical frequency of vibration of the gyroscope.

References Cited in the file of this patent

UNITED STATES PATENTS

| | | |
|---|---|---|
| 1,103,843 | Rothsten | July 14, 1914 |
| 1,646,897 | Burns | Oct. 25, 1927 |
| 1,701,519 | Walker | Feb. 12, 1929 |
| 1,803,077 | Spase | Apr. 28, 1931 |
| 1,934,597 | Foppl | Nov. 7, 1933 |
| 2,100,833 | Bruckel et al. | Nov. 30, 1937 |
| 2,198,135 | Strasburg | Apr. 23, 1940 |
| 2,225,929 | Sarazin | Dec. 24, 1940 |
| 2,412,453 | Grimshaw | Dec. 10, 1946 |
| 2,455,194 | Rumsey | Nov. 30, 1948 |
| 2,466,440 | Kiekhaefer | Apr. 5, 1949 |